United States Patent [19]

Mizukami et al.

[11] Patent Number: 5,069,322
[45] Date of Patent: Dec. 3, 1991

[54] SELF ADJUSTING CLUTCH COVER ASSEMBLY

[75] Inventors: Hiroshi Mizukami; Heiji Fukutake, both of Neyagawa, Japan

[73] Assignee: Kabushiki Kaisha Daikin Seisakusho, Osaka, Japan

[21] Appl. No.: 550,269

[22] Filed: Jul. 9, 1990

[30] Foreign Application Priority Data

Jul. 20, 1989 [JP] Japan ............................ 1-85131[U]

[51] Int. Cl.⁵ ............................................ F16D 13/75
[52] U.S. Cl. ............................. 192/70.25; 192/111 A
[58] Field of Search ........................ 192/111 A, 70.25

[56] References Cited

U.S. PATENT DOCUMENTS

| | | | |
|---|---|---|---|
| 1,631,235 | 6/1927 | Trumble | 192/70.25 |
| 3,168,175 | 2/1965 | Straub et al. | 192/111 A X |
| 4,086,995 | 5/1978 | Spokas | 192/70.25 X |
| 4,099,604 | 7/1978 | Higgerson | 192/111 A |

FOREIGN PATENT DOCUMENTS

| | | | |
|---|---|---|---|
| 2599446 | 12/1987 | France | 192/111 A |
| 0270926 | 11/1988 | Japan | 192/111 A |

Primary Examiner—Rodney H. Bonck
Attorney, Agent, or Firm—Armstrong, Nikaido, Marmelstein, Kubovcik, & Murray

[57] ABSTRACT

A clutch cover assembly for a pull-type clutch, in which a threaded part an axis of which is identical with an axis of clutch is formed on a pressure plate, a lever height adjusting ring contacting with an intermediate fulcrum point of a release lever is screwed onto the threaded part of the pressure plate, the lever height adjusting ring is relatively rotated and moved in its axial direction by means of an elastic restoring force of a spiral spring or by means of a change of engine torque and a ratchet mechanism, and a lever height is automatically increased according to a wear amount of a facing.

3 Claims, 2 Drawing Sheets

SELF ADJUSTING CLUTCH COVER ASSEMBLY

BACKGROUND OF THE INVENTION

1. Industrial Use

This invention relates to a clutch cover assembly for pull-type clutch, in which an outer peripheral fulcrum point of a release lever is supported by a clutch cover, a pressing load is exerted by an intermediate fulcrum point onto a pressure plate, and a clutch is released by pulling an inner peripheral fulcrum point toward a side opposite to the pressure plate in its axial direction against a spring for producing the pressing load.

2. Prior Art

In this type of clutch cover assembly, it has been required to prolong service life of a clutch for use in taxis and commercial vehicles etc. As an example of prolonging the service life of clutch, it has been tried to increase an effective thickness of a facing by securing the facing to a clutch disc without using rivets etc.

In a general clutch cover assembly, a wear-in allowance D is ensured by a load characteristic as diagrammed by FIG. 5. However, there is a limitation on a range of the wear-in allowance D so that, when a wear amount of the facing increases; the pressing load changes from an initial setting position P1, passes through a peak value Ps (increase in clutch applying force) and gradually decreases thereafter. Finally, the applying force becomes insufficient, slippage occurs notwithstanding that there is some facing left, and the facing can not be utilized to its maximum wear amount.

3. Object of the Invention

An object of the invention is to provide, in a pull-type clutch, a prolonged service life and a stable performance of clutch by making it possible to automatically maintain an initial setting load correspondingly to a wear amount of the facing.

SUMMARY OF THE INVENTION

In order to accomplish the above-mentioned object, in one embodiment of this invention, a threaded part, an axis of which is identical with an axis of the clutch, is formed on a pressure plate, a lever height adjusting ring, contacting with an intermediate fulcrum point to a release lever, is threaded onto the threaded part of the pressure plate, a spiral spring, urging the lever height adjusting ring in a rotating direction to increase a lever height, is interposed between the lever height adjusting ring and the pressure plate, and a clearance sensing member, fronting on a stopper surface of a clutch cover, is provided on the lever height adjusting ring with an axial clearance corresponding to a pressure plate releasing distance left therebetween.

Accordingly, as the facing is worn, the lever height adjusting ring is automatically rotated by a spring force of the spiral spring to allow the lever height to increase.

In a second embodiment of this invention, a threaded part, an axis of which is identical with an axis of the clutch, is formed on a pressure plate, a threaded part of a lever height adjusting ring, contacting with an intermediate fulcrum point of a release lever, are threaded onto the threaded part of the pressure plate, so that a height of a lever is increased when the lever height adjusting ring rotates relatively to the pressure plate in a direction opposite to a clutch rotating direction, a clearance sensing member, fronting on a stopper surface of a clutch cover, is provided on the lever height adjusting ring, with an axial clearance corresponding to a pressure plate releasing distance left therebetween, and a ratchet mechanism which permits the ring to rotate relatively to the pressure plate only in a direction to increase the lever height, is provided between the lever height adjusting ring and the pressure plate.

Accordingly, the lever height adjusting ring is automatically rotated by means of the one-way rotation function offered by the ratchet mechanism and an inertia of the lever height adjusting ring generated with engine torque fluctuation as an external force, so that the lever height can be increased.

DETAILED DESCRIPTION OF THE INVENTION

(Embodiment 1)

Figure 1:
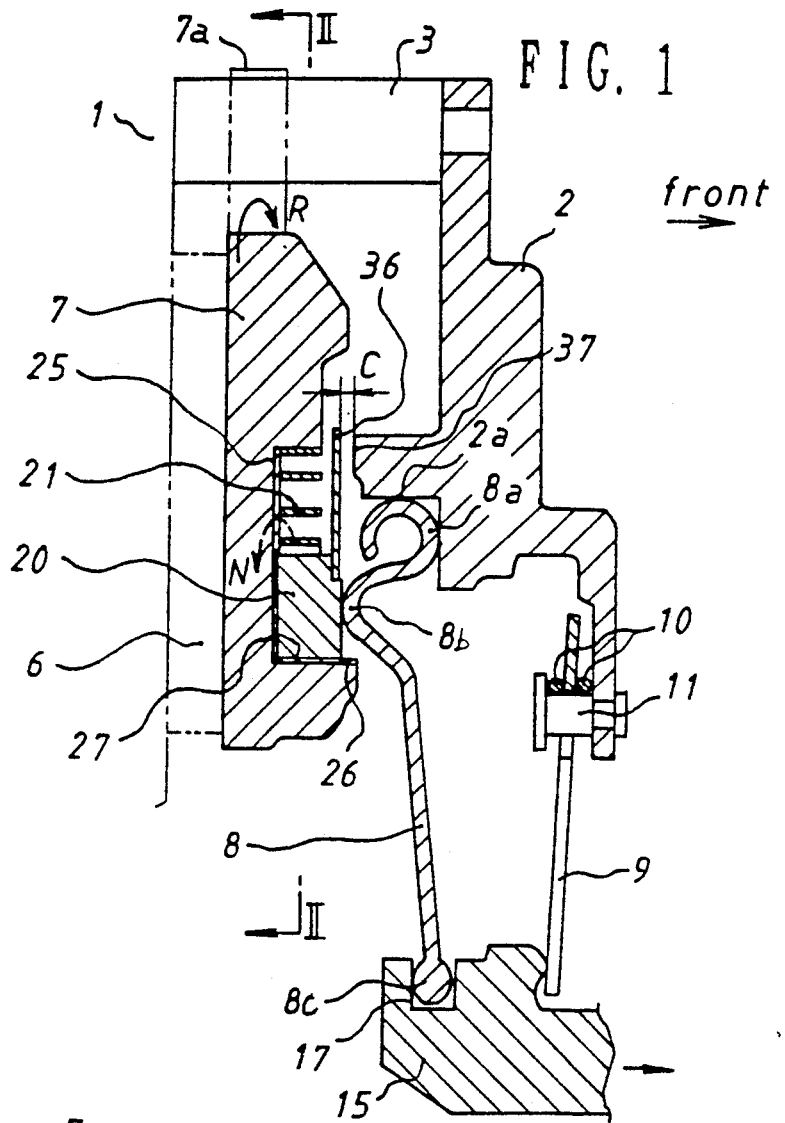
FIG. 1 is a vertical sectional view showing a clutch cover assembly for a pull-type clutch to which the first embodiment of this invention is applied.
Figure 2:
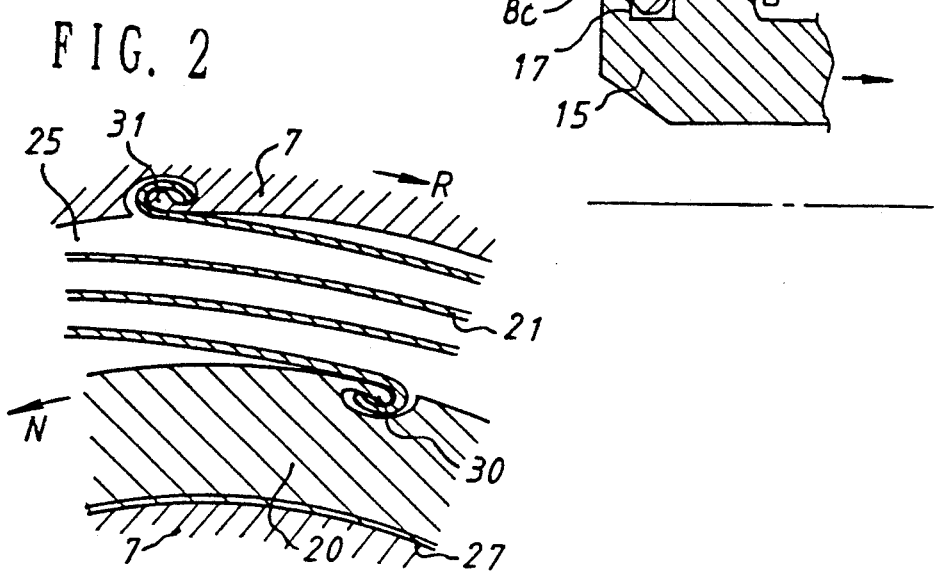
FIG. 2 is an enlarged partial sectional view taken along a line II—II of FIG. 1.

FIG. 1 and FIG. 2 show the clutch cover assembly for the pull-type clutch to which the first embodiment of this invention is applied. In FIG. 1, showing a vertical sectional view, a clutch cover 2 is connected to an input-side flywheel 1 by means of a connecting member 3 etc. Between the clutch cover 2 and the flywheel 1, there disposed a facing 6 of a clutch disc, a pressure plate 7 and a release lever 8 in this order from the flywheel 1 side (back side). A diaphragm spring 9, for producing a pressing force, is disposed in a further front side.

The diaphragm spring 9 is held between two wire rings 10, the wire rings 10 being held in a circular shape by plural stud pins 11 secured to an end wall of the clutch cover 2. An inner peripheral end portion of the diaphragm spring 9 contacts with a release sleeve 15 from a front side to force the release sleeve 15 toward the front side and away from pressure plate 7. An inner peripheral fulcrum point 8c of the release lever 8 fits into an annular rear groove 17 of the release sleeve.

The release lever 8 is disposed at three places, for example, with intervals left therebetween in a circumferential direction, and its outer peripheral fulcrum point 8a is formed into a cylindrical shape to be supported freely rotatably by a stepped part 2a of the clutch cover 2. An intermediate fulcrum point 8b is formed in the vicinity of a radial inside of the foregoing outer peripheral fulcrum point 8a in such a way as protruding rearward, so that it contacts with a front end face of a lever height adjusting ring 20 to exert a backward pressing force on the pressure plate 7.

The pressure plate 7 has plural outer peripheral projections 7a elastically connected to the clutch cover 2 through a not-shown strap plate in such a way as movable in an axial direction. An annular concave portion 25 is formed on a front surface of the pressure plate 7, and the lever height adjusting ring 20 and a spiral spring 21 are disposed in this order from radial inside in the concave portion 25.

A threaded part (male thread) 26 is formed on a peripheral end face of a radial inside of the concave portion 25, an inner peripheral threaded part (female thread) 27 screwing onto the foregoing threaded part 26 is formed on an inner peripheral surface of the lever height adjusting ring 20, and these threaded parts 26 and 27 are so devised as to move the lever height adjusting ring 20 backward, i.e. Away from pressure plate 7, by rotating the lever height adjusting ring 20 relatively to the pressure plate 7 in a clutch rotating direction R. In other words, the lever height adjusting ring 20 is moved relative to pressure plate 7 the effective to increase the effective height of the intermediate fulcrum point 8b by rotating the lever height adjusting ring 20 relatively to the pressure plate 7 in a direction N opposite to the clutch rotating direction R.

An inside end of the spiral spring 21 is clamped by a clamping part 30 of the lever height adjusting ring 20 as illustrated by FIG. 2. Spring 21 makes several rounds in the direction N opposite to the clutch rotating direction R, and an outside end of spring 21 is clamped by a clamping part 31 at an outside peripheral end surface of the concave portion 25. Thus, the spiral spring is disposed in such a way as being tensed by a specified amount. Lever height adjusting ring 20 is urged in the direction N (opposite to the clutch rotating direction R) to increase the lever effective height relatively to the pressure plate 7 by a restoring force by which the spiral spring 21 expands outward.

A clearance sensing plate 36 perpendicular to the clutch axis is secured to a front end face of the lever height adjusting ring 20 as illustrated by FIG. 1, and fronts on a facing-back stopper surface 37 with a clearance C therebetween. The above-mentioned clearance C is set identically with a pressure plate releasing distance at the time of releasing operation.

Figure 5:
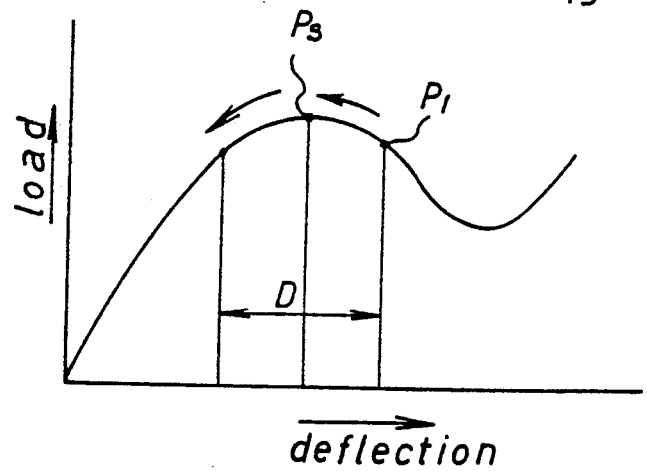
FIG. 5 is a load characteristic diagram.

Function will be described hereunder. FIG. 1 shows an initial setting state, in which the pressing load is set at a peak position Ps of FIG. 5 for instance. When the clutch is to be released, the release sleeve 15 is pulled forward, away from pressure plate 7, against a spring force of the diaphragm spring 9. The inner peripheral fulcrum point 8c of the release lever 8 is thereby moved around the outer peripheral fulcrum point 8a, so that a pressing force exerted by the intermediate fulcrum point 8b onto the pressure plate 7 is released. Then, the pressure plate 7 is moved forward by an elastic force of the strap plate to release the clutch. At time when the pressure plate 7 is moved forward as mentioned above, it moves by the amount C, corresponding to the releasing distance, to cause the clearance sensing plate 36 to contact with the stopper surface 37 of the clutch cover 2.

When the facing 6 is worn, a position of the pressure plate at the time of clutch engagement shifts backward, further away from cover 7, correspondingly to its wear amount, so that the clearance between the sensing plate 36 and the stopper surface 37 increases from C by ΔC, for example. When releasing operation is carried out under such worn condition of the facing, the lever height adjusting ring 20 is freed, relatively to the pressure plate 7 and the clutch cover 2. The load of the release lever 8 against lever height adjusting ring 20 is released and the clearance ΔC remains between the stopper surface 37 and the clearance sensing plate 36. Consequently, the lever height adjusting ring 20 is rotated by the elastic force of the spiral spring 21 relatively to the pressure plate 7 in the direction N and adjusting ring 20 moves forward, i.e. away from pressure plate 7. Thus, the effective lever height increases by the amount ΔC (wear amount) until the sensing plate 36 contacts stopper surface 37.

Under the wear-in condition, the lever height is automatically increased correspondingly to the wear amount of the facing 6 at time of the releasing operation, and the setting of the diaphragm spring 9 is thereby returned to the initial state.

(Embodiment 2)

Figure 3:
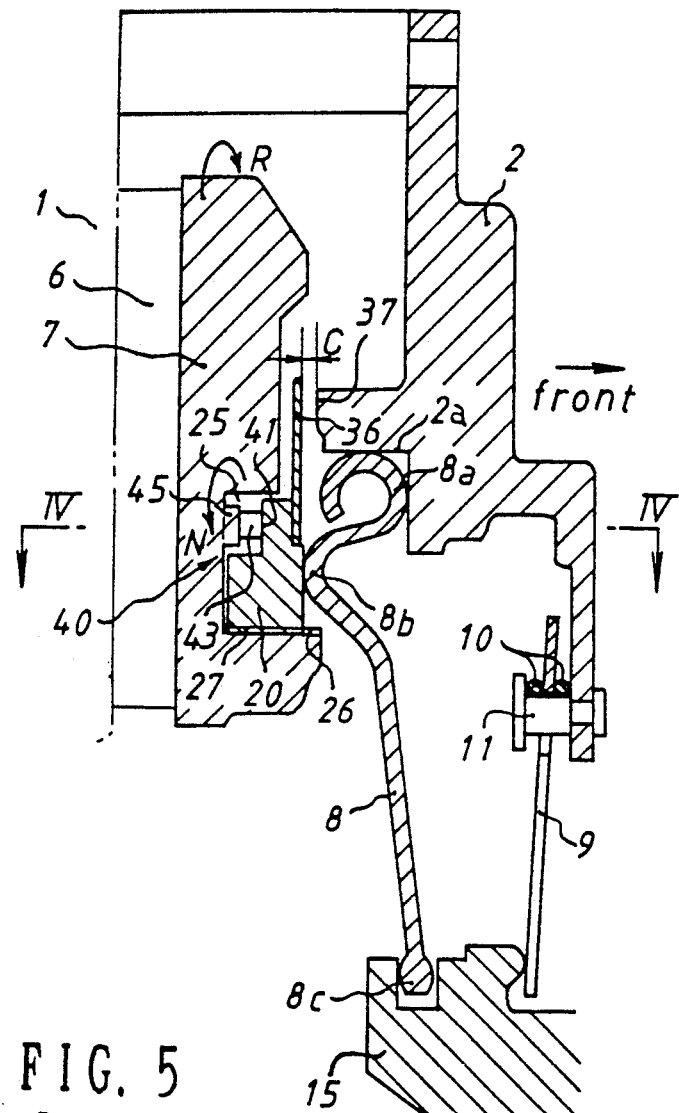
FIG. 3 is a vertical sectional view showing a clutch cover assembly for a pull-type clutch to which the second embodiment of this invention is applied.
Figure 4:
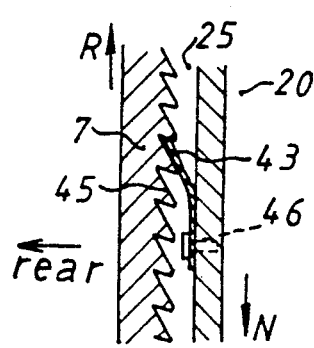
FIG. 4 is an enlarged partial sectional view taken along a line IV—IV of FIG. 3.

FIG. 3 and FIG. 4 are examples of the second embodiment of this invention. The lever height adjusting ring 20 is designed so as to be automatically rotated according to the wear amount of the facing. An engine rotation fluctuation and a ratchet mechanism 40 are utilized in place of the spiral spring of the foregoing embodiment 1. Other structures such as those of the release lever 8 and the diaphragm spring 9, etc. are identical with FIG. 1, so that components same as FIG. 1 are attached with the same symbols and description of its structure will be made hereunder in order to avoid repeated description as far as possible.

In FIG. 3 showing the vertical sectional view, the threaded part 26 is formed on a radial inside peripheral end surface of the concave portion 25 of the pressure plate 7, the inner peripheral threaded part 27 screwing onto the foregoing threaded part 26 is formed on an inner peripheral surface of the lever height adjusting ring 20, and these threaded parts 26 and 27 are so designed as to move the lever height adjusting ring 20 backward, away from pressure plate 7, by rotating the lever height adjusting ring 20 relatively to the pressure plate 7 in the clutch rotating direction R. In other words, the lever height adjusting ring 20 is moved forward to increase the effective height of the intermediate fulcrum point 8b by rotating the lever height adjusting ring 20 relatively to the pressure plate 7 in the direction N opposite to the clutch rotating direction R.

The ratchet mechanism 40 is composed of a ratchet claw 43 of the lever height adjusting ring 20 and a ratchet tooth 45 of the pressure plate 7. The ratchet claw 43 is disposed at plural places on an annular stepped part 41 of a rear end face of the lever height adjusting ring 20 with intervals left therebetween in circumferential direction.

In FIG. 4 showing the enlarged partial sectional view taken along the line IV—IV of FIG. 3; the ratchet claw 43 is secured by a rivet 46 to the lever height adjusting ring 20 at its N direction end opposite to the clutch rotating direction R, and is slanted backward, relative to the rotating direction R, at its free end, thus fitting in the ratchet tooth 45. Namely, the lever height adjusting ring 20 is permitted to rotate relatively to the pressure plate 7 only in the direction N.

Function will be described hereunder. Fundamental releasing operation is identical with that of foregoing embodiment 1, so that the pressing force is released to disengage the clutch by pulling the release sleeve 15 forward.

When the facing 6 is worn, the position of the pressure plate at the time of clutch engagement shifts backward correspondingly to its wear amount so that the clearance between the sensing plate 36 and the stopper surface 37 increases from C by ΔC. When releasing operation is carried out under such worn condition of facing, the lever height adjusting ring 20 is freed from the axial load because the load of release lever 8 against lever height adjusting ring 20 is released and the clearance ΔC remains between the stopper surface 37 and the clearance sensing plate 36.

When the lever height adjusting ring 20 is subjected to a change of engine rotation speed the lever height adjusting ring 20 is rotated relatively to the pressure plate 7 in the direction N opposite to the rotating direction R and is moved forward, i.e. away from pressure plate 7. Thus, the effective lever height increases by the amount ΔC (wear amount) until the sensing plate 36 contacts stopper surface 37.

Under the wear-in condition, the lever height is automatically increased correspondingly to the wear amount of the facing 6 at time of the releasing operation, and the setting of the diaphragm spring 9 is thereby returned to the initial state.

(Effect of the Invention)

According to the embodiments of this invention, as described above, the following advantages become obtainable:

(1) By only carrying out the ordinary releasing operation under the wear-in condition in the pull-type clutch, the lever height adjusting ring 20 can be relatively rotated and moved in axial direction and the effective lever height can be automatically increased according to the wear amount of the facing 6 by means of the elastic restoring force of the spiral spring 21 or by means of the change of engine torque and the ratchet mechanism 40.

Consequently, the facing 6 can be fully used until the wear limit is reached without carrying out maintenance work, so that intervals of exchange of clutch can be prolonged and the clutch service life can be improved.

(2) Since the clearance sensing member provided on the the lever height adjusting ring 20 fronts on the stopper surface of the clutch cover, with the axial clearance corresponding to the pressure plate releasing distance left therebetween, the effective lever height increases correspondingly to the wear amount of the facing 6, and, therefore, the setting load can always be maintained at a constant value during operation of clutch.

By setting the setting load at the peak of load characteristic at time of assembly, the setting load the same as that in assembly can be maintained regardless of the wear of facing so that torque transmitting performance of clutch does not change.

(3) Since the effective lever height automatically increases correspondingly to the wear amount of the facing 6, the position (inclination) of the diaphragm spring 9 does not change under the clutch engaged condition so that the releasing characteristic does not change.

Consequently, the clutch can always be released by the same releasing operation.

What is claimed is:

1. A self-adjusting pull-type clutch, comprising:
a clutch cover;
a release lever having an outer peripheral fulcrum point supported by said clutch cover, an intermediate pivot point and an inner peripheral fulcrum point;
a pressure plate coupled to said clutch cover and having a lever height adjusting means adjustably coupled to said pressure plate for contact with said intermediate pivot point of said release lever;
spring means coupled to said release lever for pressuring said intermediate fulcrum point into pressing contact with said lever height adjusting means;
clutch release means coupled to said inner peripheral fulcrum point of said release lever for pulling said inner peripheral fulcrum point against the pressing force of said spring means and in a direction away from said pressure plate and toward said clutch cover for moving said pressure plate toward said clutch cover to disengage said clutch;
said pressure plate and said lever height adjusting means having interengaging threaded portions disposed coaxially with respect to the direction of rotation of said pull type clutch for moving said lever height adjusting means outwardly away from said pressure plate to increase the effective height of said intermediate fulcrum point when movement of said pressure plate relative to said clutch cover exceeds a pre-determined distance; and
clearance sensing means mounted on said lever height adjusting means for preventing said moving of said lever height adjusting means outwardly from said pressure plate on said threads until said movement of said pressure plate relative to said clutch cover exceeds said pre-determined distance.

2. A self-adjusting pull-type clutch, as recited in claim 1, in which said interengaging threaded portions for moving said lever height adjusting means outwardly further includes a spiral spring connected at one of its ends to one of said pressure plate and said lever height adjusting means and at its other end to the other of said pressure plate and said lever height adjusting 3. A self-adjusting pull-type clutch, as recited in claim 1, in which said interengaging threaded portions for moving said lever height adjusting means outwardly further includes a ratchet connected to one of said pressure plate and said lever height adjusting mans and a pawl connected to the other of said pressure plate and said lever height adjusting means.

* * * * *